United States Patent [19]

Barker

[11] Patent Number: 5,127,824
[45] Date of Patent: Jul. 7, 1992

[54] BARBECUE BURNER

[75] Inventor: James Barker, Edmonton, Canada

[73] Assignee: Barbecue Innovations Incorporated, Edmonton, Canada

[21] Appl. No.: 725,291

[22] Filed: Jul. 3, 1991

[51] Int. Cl.⁵ .............................................. F23Q 9/00
[52] U.S. Cl. .................................. 431/284; 126/41 R; 431/278
[58] Field of Search .......................... 126/41 R, 25 B; 431/174, 177, 278, 284

[56] References Cited

U.S. PATENT DOCUMENTS

| | | | |
|---|---|---|---|
| 822,932 | 6/1906 | Ennis | 431/278 |
| 955,308 | 4/1910 | Bean | 431/284 |
| 1,134,114 | 4/1915 | Evans | 431/284 |
| 1,791,565 | 2/1931 | Killam | 431/278 |
| 1,903,903 | 4/1933 | McLavy et al. | 431/177 |
| 2,025,276 | 12/1935 | Drezdon | 431/284 |
| 3,638,635 | 2/1972 | Drennan | 431/278 |
| 4,909,238 | 3/1990 | Cassie | 126/41 R |
| 4,932,392 | 6/1990 | Home | 126/41 R |

*Primary Examiner*—Carroll B. Dority
*Attorney, Agent, or Firm*—Burke-Robertson

[57] ABSTRACT

A burner for a conventional gas burning barbecue of the type having a pair of gas feed valves. The burner comprises a pair of gas burner tubes, a portion of each of which is rectangularly configured. The rectangularly configured portion of one of the burner tubes is centrally positioned within the rectangularly configured portion of the other. Each of the burner tubes has an air/gas inlet tube, communicating with its rectangular portion, which is positioned to receive a gas outlet tube from a different gas feed valve of the barcecue so as to enable independent control of the gas flowing to each rectangularly configured portion.

4 Claims, 1 Drawing Sheet

BARBECUE BURNER

TECHNICAL FIELD

The present invention relates to gas barbecues and more particularly to a burner for a conventional gas burning barbecue.

BACKGROUND OF THE INVENTION

Conventional gas burning barbecues are constructed with a grill on which food is supported, beneath which a burner is positioned. Between the burner and the grill is a layer of lava or other type of porous rock which absorbs grease and other drippings from meat being cooked on the grill. The burner is usually formed from a pair of hollow tubes of "U"-configuration joined at their bases to form an "H"-configuration. Fuel from a portable fuel tank associated with the barbecue is supplied to the burner tubes through a pair of valve-controlled gas outlet tubes, so that gas may be provided to either half or simultaneously to both halves of the burner. Each of the hollow burner tubes is provided with an air/gas intake tube located adjacent its inlet end, and a venturi in the intake tube spaced from the inlet end to draw a predetermined amount of air through an opening in that intake tube to mix with the gas to provide a proper combustion mixture of gas and air. Thus, one of the air/gas intake tubes is associated with a different one of each of the burner tubes to provide independent control of the air and gas mixture being provided to its corresponding half of the burner.

One of the problems presented with such a construction of burner is that it is extremely difficult to provide a cooler temperature in the center of the barbecue, for example as would be desirable when meat is being cooked on a rotisserie centered in the barbecue. While shutting off the flow of gas and air to one half of the "H"-configuration of the burner will cool that half, this does not permit cooling of the center of the barbecue. Thus, items with high fat content or items intended to be cooked using a rotisserie which must be cooked with a minimum of flare-up, can only be cooked with difficulty.

Of background interest is Lohmeyer et al U.S. Pat. No. 4,677,964 issued Jul. 7, 1987 which describes and illustrates a gas burning barbecue in which three linear tubes are positioned spaced from side-to-side below the grill in a barbecue, each of the burner tubes having associated with it an independent gas outlet tube controlled by a different gas feed valve.

Other barbecue patents of general background interest include Steven et al U.S. Pat. No. 4,727,853, issued Mar. 1, 1988 and Schlosser et al U.S. Pat. No. 4,829,978 issued May 16, 1989.

Also of background interest is a charcoal grill conversion apparatus described and illustrated in Swanson et al U.S. Pat. No. 3,824,984 issued Jul. 23, 1974 in which a pair of gas burner tubes, of circular configuration, one of greater diameter than the other, are concentrically positioned with respect to each other and centered within a standard charcoal grill. A gas outlet tube with a single gas feed valve simultaneously feeds gas and air to the two burner tubes. No independent control of the burner tubes is taught.

It is an object of the present invention to provide a burner for conventional gas burning barbecues which will permit direct or indirect heating to both central and outlying parts of the barbecue beneath the grill. It is a further object of the present invention to provide such a burner which can be retrofitted into gas burning barbecues to replace conventional "H"-configuration burners.

SUMMARY OF THE INVENTION

In accordance with the present invention there is provided a burner for a conventional gas burning barbecue of the type having a pair of gas feed valves. The burner comprises a pair of gas burner tubes, a portion of each of which is rectangularly configured. The rectangularly configured portion of one of the burner tubes is centrally positioned within the rectangularly configured portion of the other. Each of the burner tubes has an air/gas inlet tube, communicating with its rectangular portion, which is positioned to receive a gas outlet tube from a different gas feed valve of the barbecue so as to enable independent control of the gas flowing to each rectangularly configured portion.

The burner in accordance with the present invention is designed for any existing gas burning barbecue outfitted with such a dual gas feed valve assembly. The burner according to the present invention operates in conjunction with the valves to provide the barbecue with two modes of cooking, one direct and one indirect, as will be described in more detail hereinafter.

By burning gas in the exterior rectangularly configured burner tube only, the cooking grill is provided with a cooler temperature in the center than on the periphery. This allows items with high fat content, or items intended to be cooked using a rotisserie, to be cooked with a minimum of flare-up. In addition, items such as poultry can be slow-cooked using indirect heat from this exterior burner tube and still achieve an abundance of barbecue flavor (from smoke) because of vaporization of drippings occurring along the hotter periphery.

The burner according to the present invention can be accommodated to the majority of existing conventionally designed gas barbecues merely by replacing the original equipment burner with the burner according to the present invention.

BRIEF DESCRIPTION OF THE DRAWINGS

These and other objects and advantages of the invention will become apparent upon reading the following detailed description and upon referring to the drawings in which.

Figure 1:
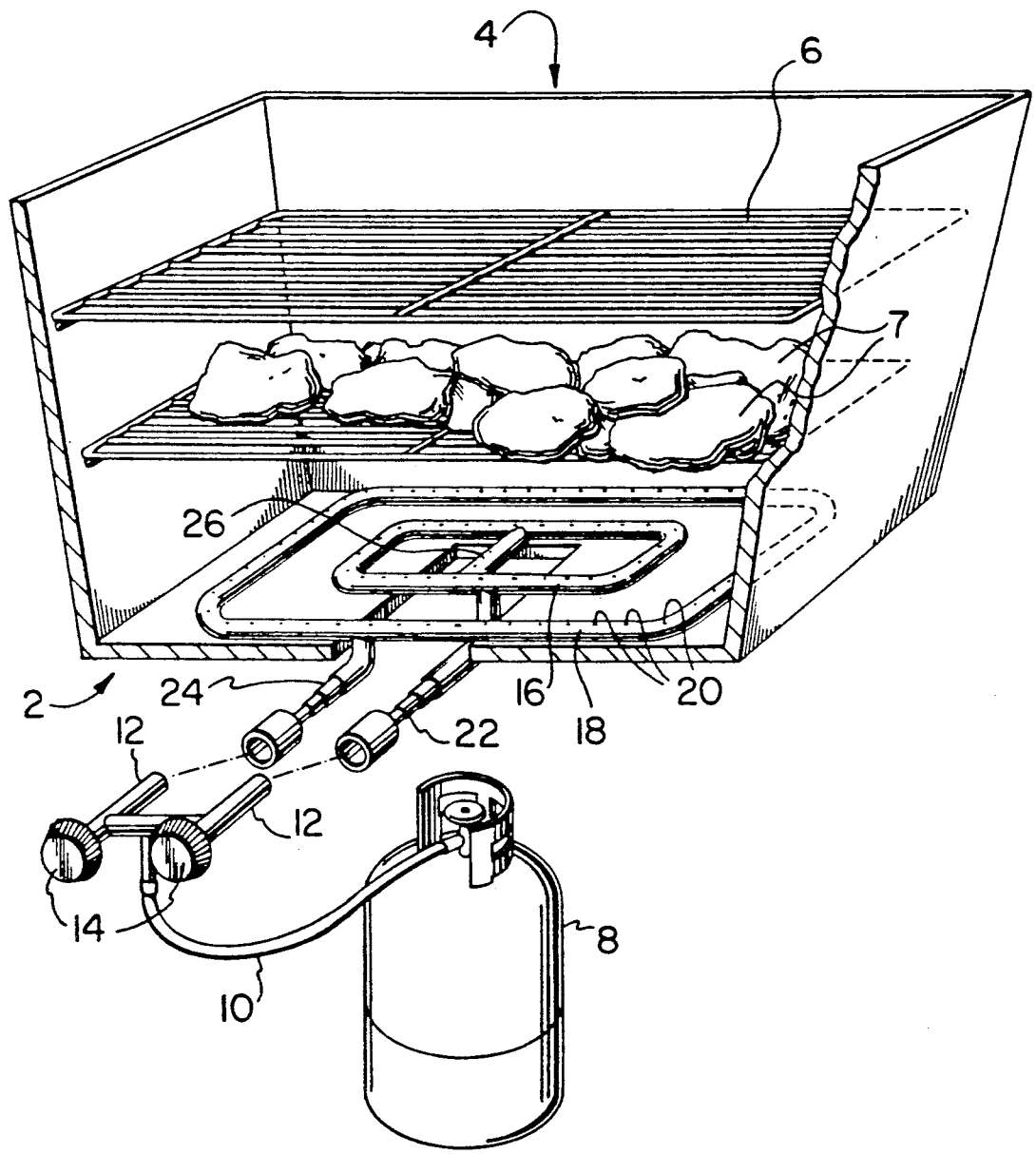
FIG. 1 is a perspective view of a burner according to the present invention.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

Turning to FIG. 1 there is illustrated a burner 2 in accordance with the present invention positioned in a conventional gas burning barbecue 4, beneath a grill 6 on which food to be cooked is supported. A layer of lava rocks 7 or the like is preferably positioned between burner 2 and grill 6. A gas tank 8 feeds gas, through tube 10 to a pair of gas outlet tubes 12. Each gas outlet tube 12 contains an independent gas feed valve 14 so as to enable independent control of gas flowing through each of the gas outlet tubes 12.

Burner 2 comprises burner tubes 16 and 18 having, on their tops, appropriate apertures 20, as illustrated, through which an air/gas mixture flows to be burned. Tubes 16 and 18 ar rectangularly configured, as illustrated, tube 16 being centered within tube 18, these rectangular portions preferably being positioned in the same plane. An inlet tube 22 communicates with burner tube 16 and the right gas outlet tube 12 of the barbecue, and inlet tube 24 communicates with burner tube 18 and the right gas outlet tube 12. Preferably inlet tubes 22 and 24 are of adjustable length (telescopic) as illustrated and contain flexible conventional venturi tubes (not illustrated) which lead an air/gas mixture from these inlet tubes to the rectangular portions of the burner tubes for burning. In this manner, burner tube 16, the inner coil, and burner tube 18, the outer coil, are both independently fed and controlled by gas feed valves 14. Outer coil 18 is preferably of a size that it runs around the perimeter of the casting of barbecue 4, but not so close that the flame produced would touch the casting walls. Inner coil 16 preferably has a cross arm burner tube portion 26 centrally intersecting its rectangle. Spaces are provided between the casting wall and the exterior burner, and as well between the interior burner tube 16 and the exterior burner tube 18, the quantitative measurement of these spaces being determined by the specific application.

The burner tubes could be constructed from stainless steel, cast iron, porcelain-coated metal, aluminum or other heat resistant material. Compositional materials will be dependent upon specific applications.

In operation, in the direct mode, both gas feed valves 14 are open so that a gas/air mixture is inputed simultaneously to both the interior and exterior burner tubes 16 and 18 respectively. This produces an abundance of evenly distributed heat over the entire cooking surface beneath the grill 6. This is an ideal mode for the rapid searing of foods like steak or chops.

In the indirect mode, one valve (for example a valve controlling gas to inlet tube 24), is the only open valve, so that a gas and air mixture is being inputed to the rectangular portion of exterior burner tube 18 only. Thus, the interior burner tube 16 is shutoff. This enables the barbecue's cooking grill to have a cooler temperature in the center than on the periphery, allowing items with high fat contents, or items intended to be cooked using a rotisserie, to be cooked with a minimum of flare-up. In addition, items such as poultry can be slow-cooked, using indirect heat and still achieve an abundance of barbecue flavor (from smoke) due to the vaporization of drippings occurring along the hotter periphery. Thus, the versatility of a barbecue with special additional burners for rotisserie cooking as well as standard barbecue cooking is provided with the burner according to the present invention.

Burner 2 offers the additional advantage of permitting the use of the interior burner tube 16 on low settings, instead of being shutoff entirely, in combination with the exterior burner tube 18, for virtually infinite variation of cooking temperatures.

Burner 2 is intended to be retrofitted to the majority of existing conventionally designed gas barbecues by merely replacing the original equipment burner by a burner in accordance with the present invention.

The burner system according to the present invention provides an direct/indirect cooking feature as found for example in the construction presented by U.S. Pat. No. 4,677,964 without the additional cost of three separate independent valve and burner combinations. As well it provides greater cooking range and versatility than existing gas barbecues of conventional "H"-configuration that can only provide indirect heating by shutting off an entire side of the barbecue.

Thus it is apparent that there has been provided in accordance with the invention a barbecue burner that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A burner for a conventional gas burning barbecue having a pair of gas feed valves during operation to feed a gas/air mixture to gas burner tubes, the burner comprising a pair of gas burner tubes, a portion of each of which is rectangularly configured, the rectangularly configured portion of one of the burner tubes centrally positioned within the rectangularly configured portion of the other and centrally intersected by a cross arm burner tube portion, said rectangular portions and said cross arm portion having apertures along their lengths, each of the burner tubes having an inlet tube, communicating with its rectangular portion, which is positioned to receive a gas outlet tube from a different gas feed valve of the barbecue so as to enable independent control of the gas flowing to each rectangularly configured portion.

2. A burner according to claim 1 wherein the rectangularly configured portions of each burner tube are in the same plane.

3. A burner according to claim 2 wherein the rectangularly configured portions of the burner tubes are spaced from each other so as to provide even heating within the barbecue, as required, when both burner tubes are operating.

4. A burner according to claim 1 wherein the inlet tubes are of telescopically adjustable length.

* * * * *